(12) United States Patent
Okahisa et al.

(10) Patent No.: US 12,271,099 B2
(45) Date of Patent: Apr. 8, 2025

(54) LIGHT-EMITTING DEVICE AND METHOD OF MANUFACTURING THE SAME

(71) Applicant: NICHIA CORPORATION, Anan (JP)

(72) Inventors: Tsuyoshi Okahisa, Tokushima (JP); Shinya Matsuoka, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/588,173

(22) Filed: Feb. 27, 2024

(65) Prior Publication Data

US 2024/0201567 A1    Jun. 20, 2024

Related U.S. Application Data

(63) Continuation of application No. 17/961,648, filed on Oct. 7, 2022, now Pat. No. 11,947,245, which is a (Continued)

(30) Foreign Application Priority Data

Aug. 31, 2018  (JP) .................................. 2018-162681

(51) Int. Cl.
*F21V 5/00*    (2018.01)
*G02B 3/00*    (2006.01)
(Continued)

(52) U.S. Cl.
CPC ........... *G03B 15/05* (2013.01); *G02B 3/0056* (2013.01); *G02B 3/08* (2013.01); *F21V 5/007* (2013.01);
(Continued)

(58) Field of Classification Search
CPC . F21V 5/007; F21V 5/045; F21V 9/30; G02B 19/0014; G02B 19/0066;
(Continued)

(56) References Cited

U.S. PATENT DOCUMENTS

| | | | |
|---|---|---|---|
| 7,888,868 B2 * | 2/2011 | Kuan | ........................ F21K 9/69 |
| | | | 313/512 |
| 2005/0135094 A1 | 6/2005 | Lee et al. | |

(Continued)

FOREIGN PATENT DOCUMENTS

| | | |
|---|---|---|
| JP | 2005-183986 A | 7/2005 |
| JP | 2005-347279 A | 12/2005 |

(Continued)

OTHER PUBLICATIONS

Final Office Action in U.S. Appl. No. 16/557,260 dated Sep. 16, 2020.

(Continued)

*Primary Examiner* — Zheng Song

(74) *Attorney, Agent, or Firm* — Foley & Lardner LLP

(57) ABSTRACT

A light-emitting device includes: a plurality of light-emitting elements arranged in an array on a base member; and a lens that includes at least one lens part disposed above the base member and including a first surface that faces the plurality of light-emitting elements, the first surface including a plurality of protrusions. The plurality of light-emitting elements include: a first light-emitting element having a center that faces a lens center of the lens in a top view, and a second light-emitting element having a center offset from the lens center of the lens in the top view. A red component of light emitted from the second light-emitting element is greater than a red component of light emitted from the first light-emitting element.

18 Claims, 7 Drawing Sheets

Related U.S. Application Data continuation of application No. 17/221,213, filed on Apr. 2, 2021, now Pat. No. 11,500,269, which is a continuation of application No. 16/557,260, filed on Aug. 30, 2019, now Pat. No. 10,983,416.

(51) Int. Cl.
    *G02B 3/08*     (2006.01)
    *G03B 15/05*     (2021.01)
    *F21V 5/04*     (2006.01)
    *F21V 9/30*     (2018.01)

(52) U.S. Cl.
CPC .............. *F21V 5/045* (2013.01); *F21V 9/30* (2018.02); *G03B 2215/0589* (2013.01)

(58) Field of Classification Search
CPC ........ G02B 3/0056; G02B 3/08; G02B 15/02; G02B 15/05; G02B 2215/0589; G02B 2215/0592
See application file for complete search history.

(56) References Cited

U.S. PATENT DOCUMENTS

| | | | |
|---|---|---|---|
| 2005/0201101 A1 | 9/2005 | Shimura | |
| 2005/0201109 A1 | 9/2005 | Shimura | |
| 2006/0139953 A1* | 6/2006 | Chou | ................ G02F 1/133603 362/613 |
| 2006/0198137 A1 | 9/2006 | Lee et al. | |
| 2007/0034890 A1 | 2/2007 | Daschner et al. | |
| 2009/0160330 A1 | 6/2009 | Hsu et al. | |
| 2010/0025700 A1* | 2/2010 | Jung | ..................... F21V 23/009 257/89 |
| 2010/0178046 A1 | 7/2010 | Moon et al. | |
| 2010/0246176 A1* | 9/2010 | Shyu | ..................... G03B 15/03 362/326 |
| 2012/0068615 A1* | 3/2012 | Duong | ................... A01G 9/249 313/503 |
| 2012/0081897 A1 | 4/2012 | Ogawa et al. | |
| 2012/0319616 A1 | 12/2012 | Quilici et al. | |
| 2013/0153934 A1 | 6/2013 | Daschner et al. | |
| 2013/0265752 A1 | 10/2013 | Shimizu | |
| 2014/0316742 A1 | 10/2014 | Sun et al. | |
| 2014/0355273 A1 | 12/2014 | Saito | |
| 2015/0054005 A1 | 2/2015 | Kim et al. | |
| 2015/0124445 A1* | 5/2015 | Park | ...................... F21V 7/0016 362/235 |
| 2015/0129912 A1 | 5/2015 | Wang et al. | |
| 2015/0276151 A1 | 10/2015 | Chen | |
| 2016/0348874 A1 | 12/2016 | Aruga | |
| 2016/0363302 A1 | 12/2016 | Madril | |
| 2016/0363747 A1 | 12/2016 | Krijn et al. | |
| 2017/0023211 A1 | 1/2017 | Sepkhanov et al. | |
| 2017/0184275 A1 | 6/2017 | Aruga | |
| 2017/0191637 A1 | 7/2017 | Gommans et al. | |
| 2018/0172242 A1 | 6/2018 | Stopa et al. | |
| 2018/0306405 A1* | 10/2018 | Kong | ......................... F21V 5/04 |
| 2019/0264890 A1 | 8/2019 | Chang et al. | |

FOREIGN PATENT DOCUMENTS

| | | |
|---|---|---|
| JP | 2007-049172 A | 2/2007 |
| JP | 2013-535100 A | 9/2013 |
| JP | 2016-224394 A | 12/2016 |
| WO | WO-2012/096203 A1 | 7/2012 |

OTHER PUBLICATIONS

Non-Final Office Action in U.S. Appl. No. 16/557,260 dated May 5, 2020.
Non-Final Office Action in U.S. Appl. No. 17/961,648 dated Oct. 23, 2023.
Notice of Allowance in U.S. Appl. No. 16/557,260 dated Dec. 18, 2020.
Notice of Allowance in U.S. Appl. No. 16/557,260 dated Jan. 4, 2021.
Notice of Allowance in U.S. Appl. No. 17/221,213 dated Jul. 20, 2022.
Notice of Allowance in U.S. Appl. No. 17/961,648 dated Dec. 4, 2023.
US Office Action in U.S. Appl. No. 17/221,213 dated Jan. 27, 2022.

* cited by examiner

LIGHT-EMITTING DEVICE AND METHOD OF MANUFACTURING THE SAME

CROSS-REFERENCE TO RELATED APPLICATIONS

The present application is a continuation of U.S. patent application Ser. No. 17/961,648, filed on Oct. 7, 2022, which is a continuation of U.S. patent application Ser. No. 17/221,213, filed on Apr. 2, 2021 (now U.S. Pat. No. 11,500,269), which is a continuation of U.S. patent application Ser. No. 16/557,260, filed on Aug. 30, 2019 (now U.S. Pat. No. 10,983,416), which claims priority to Japanese Patent Application No. 2018-162681, filed on Aug. 31, 2018. The contents of these applications are incorporated herein by reference in their entireties.

BACKGROUND OF THE INVENTION

The present disclosure relates to a light-emitting device and a method of manufacturing the same.

Known light-emitting devices used for a flash for camera, etc., include a plurality of light-emitting elements, and a plurality of lenses, each combined with a respective one of the plurality of the light-emitting elements (for example, see Japanese Patent Application Publication No. 2016-224394).

SUMMARY

When the number of light-emitting elements in a light-emitting device is increased so as to increase the output power, the size of a lens is increased, which leads to increase in size of the light-emitting device. Therefore, in order to miniaturize the device without changing the number of light-emitting elements and the size of the lens, reduction in the distance between the light-emitting elements is considered. However, reduction in the distance between the light-emitting elements may cause unevenness in the illuminance distribution. In particular, reduction in the distance between the light-emitting elements that emit different colors may cause unevenness in emission color when the light-emitting elements are turned on at the same time.

Certain embodiments according to the present disclosure allow for obtaining a light-emitting device with small size in which unevenness in emission color is reduced, and a method of manufacturing the light-emitting device.

According to one embodiment, a light-emitting device includes a plurality of light-emitting elements arranged in an array on a base member; and a compound eye lens that has a plurality of lens parts disposed above the base member and facing the plurality of light-emitting elements. The plurality of light-emitting elements are arranged such that each of the plurality of light-emitting elements faces a corresponding one of the lens parts, and the center of each of the plurality of light-emitting elements is offset from a lens center of the corresponding one of the lens parts of the compound eye lens in a direction toward a center of the compound eye lens in a plan view. The plurality of light-emitting elements include first light-emitting elements and second light-emitting elements that are alternately arranged, an emission color of the first light-emitting elements and an emission color of the second light-emitting elements different from each other.

According to another embodiment, a light-emitting device includes a plurality of light-emitting elements provided in an array on a base member; and a compound eye lens that has a plurality of lens parts disposed above the base member and facing the plurality of light-emitting elements. The plurality of light emitting elements include: one light-emitting element having a center that faces a lens center of a lens portion of the plurality of lens portions that is disposed at a center of the compound eye lens in a plan view, and other light-emitting elements, each of which faces a corresponding one of the plurality of lens parts and has a center offset from a lens center of the corresponding one of the plurality of lens parts of the compound eye lens in a direction toward the center of the compound eye lens in a plan view, including first light-emitting elements and second light-emitting elements that are alternately arranged, an emission color of the first light-emitting elements and an emission color of the second light-emitting elements different from each other.

According to another embodiment, a method of manufacturing a light-emitting device includes arranging a plurality of light-emitting elements in an array on a base member; and securing a compound eye lens having a plurality of lens parts above the base member. In the step of arranging light-emitting elements, the plurality of light-emitting elements are arranged such that each of the plurality of light-emitting elements faces a corresponding one of the plurality of lens parts and the center of each of the plurality of light-emitting elements is offset from a lens center of the corresponding one of the lens parts of the compound eye lens in a direction toward a center of the compound eye lens. The plurality of light-emitting elements includes first light-emitting elements and second light-emitting elements that are alternately arranged, an emission color of the first light-emitting elements and an emission color of the second light-emitting elements different from each other.

According to certain embodiments of the present disclosure, it is possible to obtain a light-emitting device of a small size in which unevenness in emission color is reduced. According to certain embodiments of the present disclosure, it is possible to manufacture a light-emitting device of a small size in which unevenness in emission color is reduced.

DETAILED DESCRIPTION

Figure 1:
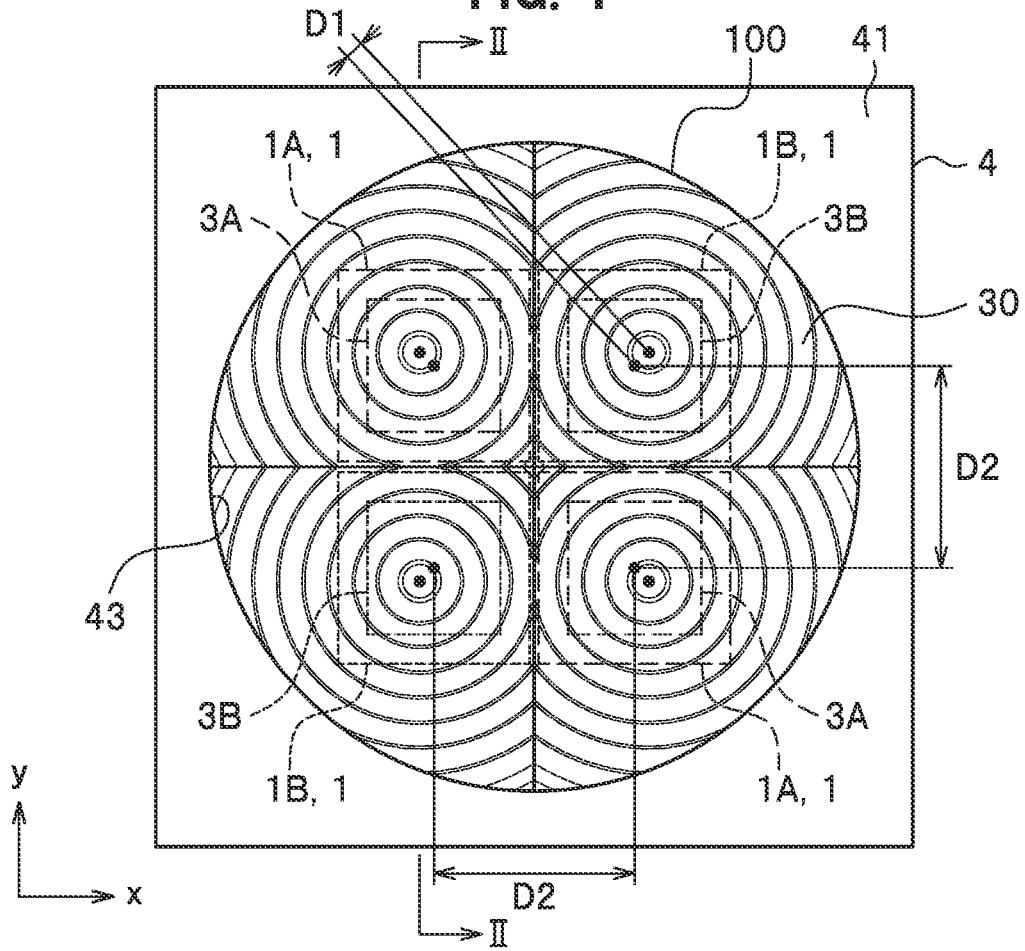
FIG. 1 is a schematic plan view showing a configuration of a light-emitting device according to a first embodiment.

Hereinafter, embodiments of a light-emitting device according to the present invention are described.

The drawings referred to in the description below schematically illustrate certain embodiments of the present invention, and scale, distance, positional relationship and the like of members may be exaggerated, or illustration of a part of a member may be omitted. Also, the scale of a member and distance between members may not be consistent between the plan view and the sectional view. Further, in the description below, the same designations or reference numerals indicate the same members or members made of the same materials, and a detailed description thereof is omitted as appropriate.

In a light-emitting device according to certain embodiments of the present invention, the terms "upper," "lower," "left" and "right" are interchangeable depending on the situation. In the present specification, the terms such as "upper" and "lower" are used to indicate a relative position between components in the drawings referred to for an explanation, and are not intended to indicate an absolute position unless otherwise specified.

First Embodiment

Configuration of Light-Emitting Device

Figure 2:
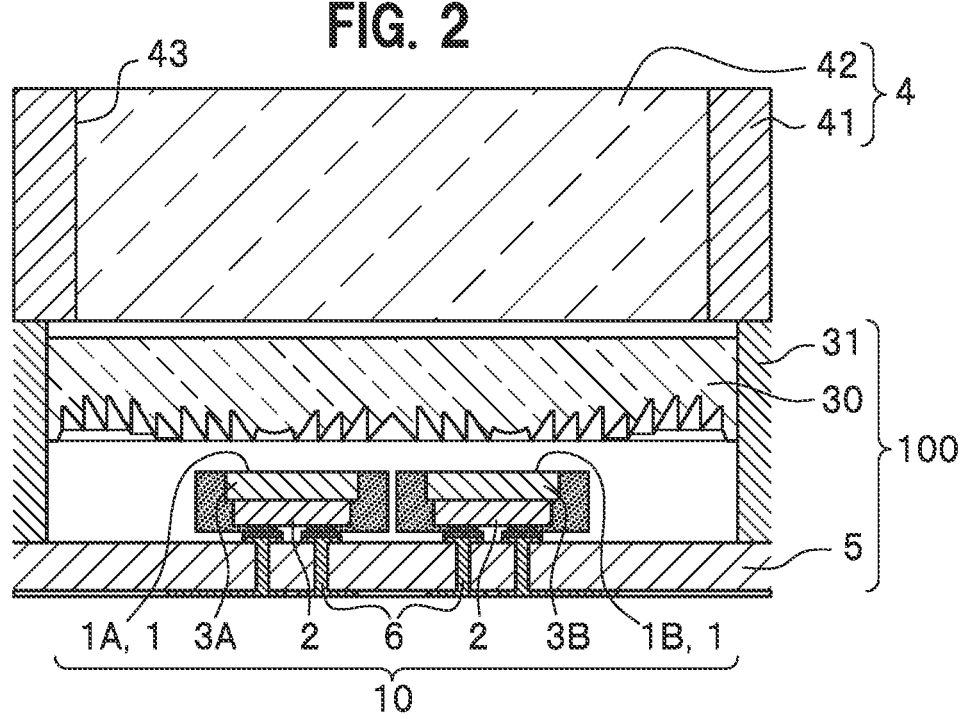
FIG. 2 is a schematic sectional view taken along the line II-II in FIG. 1.
Figure 3:
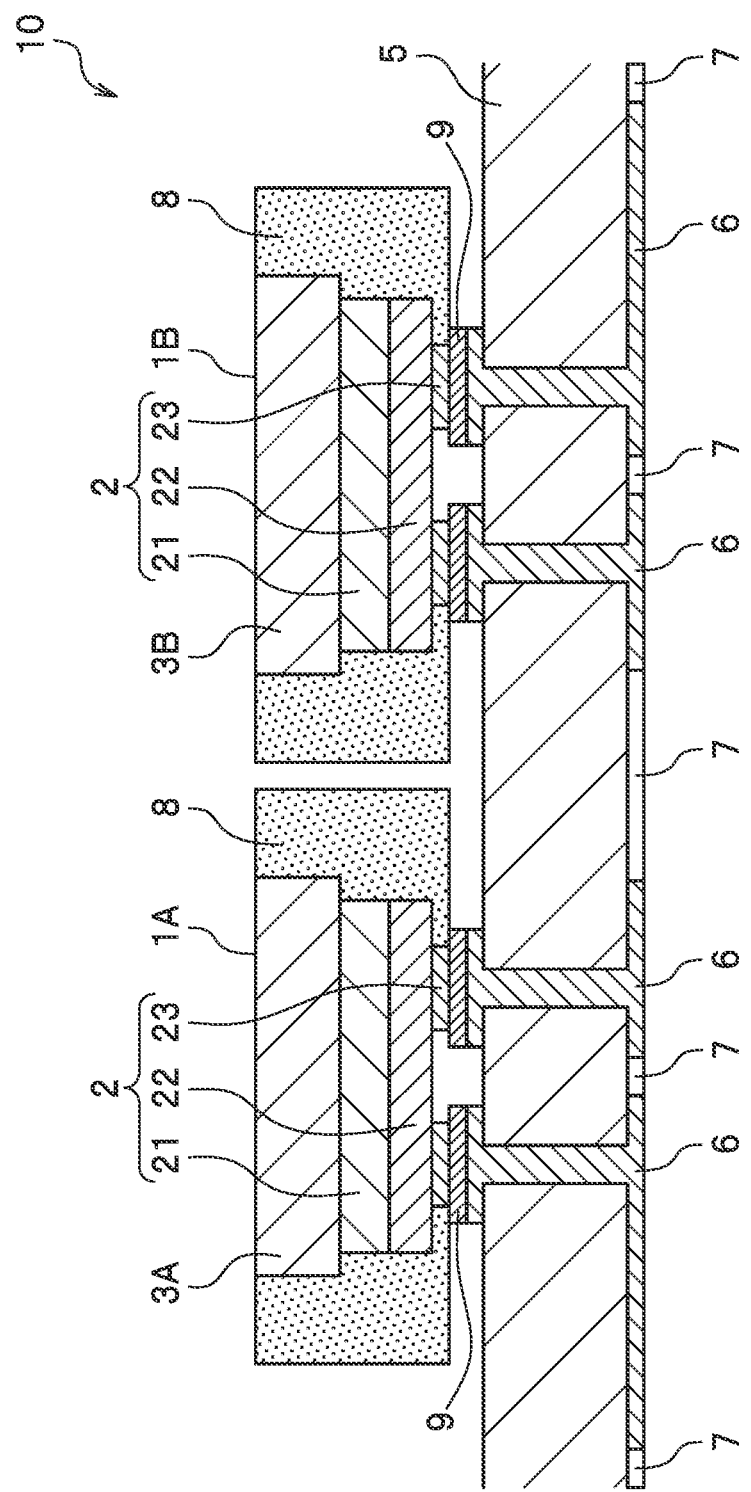
FIG. 3 is a schematic sectional view showing an example of a configuration of a light source device shown in FIG. 2.

A configuration of a light-emitting device according to a first embodiment of the present invention is described with reference to FIGS. 1 to 3. FIG. 1 is a schematic plan view showing the configuration of the light-emitting device according to the first embodiment. FIG. 2 is a schematic sectional view taken along the line II-II in FIG. 1. FIG. 3 is a schematic sectional view showing an example of a configuration of a light source device shown in FIG. 2.

A light-emitting device 100 constitutes, for example, a flash module for a camera. The light-emitting device 100 is incorporated in a housing 4 of a smartphone, a tablet terminal or the like. The housing 4 includes a main body 41 made of, for example, stainless steel, and a cover glass 42 covering the light-emitting device 100 incorporated in the housing 4. The cover glass 42 is disposed in a through hole 43 of the main body 41. FIG. 1 shows a portion of the light-emitting device that can be seen through the cover glass 42 attached to the through hole 43 of the main body 41.

The light-emitting device 100 includes a light source device 10 having a plurality of light-emitting elements 1 disposed in an array on a base member 5, and a compound eye lens 30. The plurality of light-emitting elements 1 include first light-emitting elements 1A and second light-emitting elements 1B having different emission colors. The first light-emitting elements 1A and the second light-emitting elements 1B are alternately arranged in an array on the base member 5. When described without identifying as the first light-emitting element 1A or the second light-emitting element 1B, each of the plurality of light-emitting elements 1 is referred to as a light-emitting element 1. The compound eye lens 30 is disposed above the base member 5 such that a lens holder 31 is disposed between the compound eye lens 30 and the base member 5, and the compound eye lens 30 has lens parts each facing a respective one of the light-emitting elements 1. As shown in FIG. 1, in a plan view, the plurality of light-emitting elements 1 are arranged such that the center of each of the plurality of light-emitting elements, each facing a corresponding one of the lens part of the compound eye lens 30, is located offset from the lens center of the corresponding lens portion of the compound eye lens 30 in a direction toward the center of the compound eye lens 30.

The light source device 10 further includes the base member 5 and conductive wirings 6 as shown in FIG. 3. The base member 5 is a component supporting the light-emitting elements 1 and the like, and a common package substrate for a light-emitting device can be used for the base member 5. For example, a ceramic substrate such as an AlN substrate, a metal substrate such as an Al substrate, or a resin substrate such as a glass epoxy substrate can be used for the base member 5.

The conductive wirings 6 are disposed, for example, on an upper surface of the base member 5. The conductive wirings 6 are wirings for supplying power to the light-emitting elements 1 from the outside, and are patterned in a predetermined shape on the base member 5. Each conductive wiring 6 includes, for example, a wiring portion penetrating the base member 5 and another wiring portion exposed at the lower surface of the base member 5, with which each conductive wiring 6 is connected to an external power supply. For the conductive wirings 6, wirings commonly used for package substrates of light-emitting devices can be used. The wirings are preferably made of a metal, for example, a single metal such as Ag, Al, Ni, Rh, Au, Cu, Ti, Pt, Pd, Mo, Cr, and W, or an alloy containing one or more of these metals. More preferably, the wirings are made of a single metal having a high reflectivity such as Ag, Al, Pt, and Rh, or an alloy containing one or more of these metals.

The wiring electrically connected to the negative electrode of each of the light-emitting elements 1 and exposed from the lower surface of the base member 5 and the wiring electrically connected to the positive electrode of the light-emitting element 1 and exposed from the lower surface of the base member 5 are insulated by an insulating layer 7.

The light-emitting device 100 includes the plurality of light-emitting elements 1. Each light-emitting element 1 includes a light-emitting diode, a wavelength conversion member disposed on the light-emitting diode, and a protective member covering lateral surfaces of the light-emitting diode and lateral surfaces of the wavelength conversion member. Each light-emitting element 1 is mounted on the upper surface of the base member 5 so as to be electrically connected to the conductive wiring 6. The plurality of light-emitting elements 1 are arranged in a plan view. Of the plurality of light-emitting elements 1, the first light-emitting elements 1A emit white light, and the second light-emitting elements 1B emit light having a more red component than that of light emitted by the first light-emitting elements 1A. The description below is on the assumption that the second light-emitting elements 1B emit amber light.

The term "amber" as used herein refers to a chromaticity range including the longer-wavelength range of yellow and the shorter-wavelength range of yellowish red in JIS Z 8110, and a chromaticity range between the yellow range and the short-wavelength range of yellow red in JIS Z 9101, which defines safety colors. For example, the "amber" as used herein refers to a color having a dominant wavelength in a range of 580 nm to 600 nm.

The light-emitting diode includes a semiconductor layer 22 on a light transmissive substrate 21 such as a sapphire substrate. The semiconductor layer 22 includes an n-side semiconductor layer, an active region, and a p-side semiconductor layer in order from the substrate 21 side. For a light-emitting diode 2 configured to ultraviolet light or blue-to-green visible light, for example, a GaN-based or InGaN-based nitride semiconductor expressed as $In_XAl_YGa_{1-X-Y}N$ ($0 \leq X \leq 1$, $0 \leq Y \leq 1$, $X+Y \leq 1$) can be used. The substrate 21 may be removed. A plan view shape of the light-emitting diode 2 is, for example, a rectangular shape, but may be a circle, an ellipse, a triangle, or a polygon such as a hexagon.

The light-emitting diode 2 that has positive and negative electrodes 23 on an identical surface is preferable, and thus is capable of being flip-chip mounted on or above the base member 5. In the present embodiment, the positive and negative electrodes 23 of the light-emitting diode 2 are respectively electrically connected to the conductive wirings 6 of the base member 5 via a bonding member 9 such as a bump, a conductive paste, or solder.

Each first light-emitting element 1A includes a blue light-emitting diode 2, a first wavelength conversion member 3A provided on the blue light-emitting diode 2, and a protective member 8 covering lateral surfaces of the blue light-emitting diode 2 and lateral surfaces of the first wavelength conversion member 3A.

The first wavelength conversion member 3A is disposed covering an upper surface of the light-emitting diode 2 in a top view. The first wavelength conversion member 3A is a plate-like light transmissive member having a substantially rectangular shape in a plan view, and contains a yellow phosphor.

Examples of the yellow phosphor contained in the first wavelength conversion member 3A include $Tb_{2.95}Ce_{0.05}Al_5O_{12}$, $Y_{2.90}Ce_{0.05}Tb_{0.05}Al_5O_{12}$, $Y_{2.94}Ce_{0.05}Pr_{0.01}Al_5O_{12}$, and $Y_{2.90}Ce_{0.05}Pr_{0.05}Al_5O_{12}$, in addition to an yttrium aluminum oxide phosphor (YAG phosphor).

A light transmissive resin, glass, or the like can be used for the light transmissive member. Examples of the light transmissive resin include thermosetting resins such as silicone resin, silicone modified resin, epoxy resin, and phenol resin, and thermoplastic resins such as polycarbonate resin, acrylic resin, methyl pentene resin, and polynorbornene resin. In particular, silicone resins having good light-resisting properties and good heat-resisting properties are suitable. The transmittance of the light transmissive member with respect to light emitted from the light-emitting diode is preferably 70% or greater, more preferably 80% or greater.

Each second light-emitting element 1B includes a blue light-emitting diode 2, a second wavelength conversion member 3B provided on the blue light-emitting diode 2, and a protective member 8 covering lateral surfaces of the blue light-emitting diode 2 and lateral surfaces of the second wavelength conversion member 3B.

The second wavelength conversion member 3B is disposed covering an upper surface of the blue light-emitting diode 2 in a top view. The second wavelength conversion member 3B is a light transmissive member having a plate-like shape with a substantially rectangular shape in a plan view. The second wavelength conversion member 3B includes a red phosphor that converts blue light emitted from the blue light-emitting diode 2 into amber light.

Examples of the red phosphor contained in the second wavelength conversion member 3B preferably include, for example, a nitride-based phosphor such as $(Sr_{0.97}Eu_{0.03})_2Si_5N_8$, $(Ca_{0.985}Eu_{0.015})_2Si_5N_8$, and $(Sr_{0.679}Ca_{0.291}Eu_{0.03})_2Si_5N_8$, in addition to sialon phosphor (SiAlON phosphor). On the other hand, the resin materials, glass, and the like described above can be used for the light transmissive member containing the red phosphor.

The first light-emitting elements 1A and the second light-emitting elements 1B are arranged electrically independent of each other. More specifically, the light source device 10 is configured such that the first light-emitting elements 1A and the second light-emitting elements 1B can be individually controlled, so that the intensity of light extracted from the first light-emitting elements 1A and the second light-emitting elements 1B can be controlled in a desired manner. The first light-emitting elements 1A and the second light-emitting elements 1B are electrically independent from each other, but may be on the same circuit 1.

Each first light-emitting element 1A and each second light-emitting element 1B respectively includes the protective members 8. Each protective member 8 protects the lateral surfaces of the light-emitting diode and the lateral surfaces of the wavelength conversion member. The protective member 8 directly or indirectly covers the lateral surfaces of the light-emitting diode and the lateral surfaces of the wavelength conversion member. In the first light-emitting elements 1A and the second light-emitting elements 1B, and upper surface of each of the first wavelength conversion members 3A and an upper surface of each of the second wavelength conversion members 3B are exposed from the protective members 8, and constitute light-emitting surfaces (i.e., main light extraction surfaces) of the first light-emitting elements 1A and the second light-emitting elements 1B, respectively. The protective members 8 are preferably made of a material having a high light reflectance. For example, a resin material containing a light reflective substance can be used for the protective member 8. Examples of the light reflective substance include titanium oxide, silicon oxide, zirconium oxide, potassium titanate, aluminum oxide, aluminum nitride, boron nitride, zinc oxide, and mullite. A resin material whose main component is a thermosetting resin such as epoxy resin, silicone resin, silicone modified resin, or phenol resin is preferable for a base material of the protective member 8. The protective member 8, can also be composed of a material transmissive to visible light may be as needed.

The compound eye lens 30 is provided above the light source device 10 such that the lens holder 31 is disposed between the compound eye lens 30 and the light source device 10. The lens holder 31 is disposed on the light source device 10 via an adhesive member such as resin. The compound eye lens 30 disposed covering the entirety of the light-emitting surface of each of the first light-emitting elements 1A and the entirety of the light-emitting surface of each of the second light-emitting elements 1B in a plan view, as shown in FIG. 1. In a plan view, the compound eye lens 30 may have, for example, a rectangular, a circular, or an elliptic external shape. The compound eye lens 30 can be manufactured using a known method and a known material in the art. Examples of a material of the compound eye lens 30 include a resin and a glass. The material of the compound eye lens may contain a light diffusing material and the like.

Each of the lens parts of the compound eye lens 30 forms a Fresnel lens. The Fresnel lens includes an uneven first surface facing the light source device 10 and a flat second surface, such that a light beam emitted from the light source device 10 is incident on the first surface and is emitted from the second surface. The lens part having a Fresnel lens structure allows for reducing a thickness of the lens part, so that a length of an entirety of the light-emitting device can be reduced in a light extraction direction. Further, reduction in thickness of the lens part allows an air layer to be easily present between the compound eye lens 30 and the light source device 10. With the air layer, spread of light emitted from the light source device 10 can be adjusted. The compound eye lens 30 is provided with the lens holder 31 at an outer periphery of the compound eye lens 30. The lens holder 31 is secured on the compound eye lens 30 above the light source device 10 such that the air layer is interposed between the upper surface of the light-emitting element 1 and the light incident surface of the compound eye lens 30.

In an example shown in FIG. 1, the compound eye lens 30 includes four Fresnel lenses. Under the compound eye lens 30, the two first light-emitting elements 1A and the two second light-emitting elements 1B are provided in an array. The four Fresnel lenses are arranged in two rows and two columns. As in the four Fresnel lenses, the two first light-emitting elements 1A and the two second light-emitting elements 1B are arranged in two rows and two columns as an entirety.

More specifically, in a first row of the two rows, the first light-emitting element 1A and the second light-emitting element 1B are arranged adjacent to each other in this order. In the second row of the two rows, the second light-emitting element 1B and the first light-emitting element 1A are arranged adjacent to each other in this order.
That is to say, the two first light-emitting elements 1A and the two second light-emitting elements 1B are provided in the array of two rows and two columns so as to form a substantially rectangular shape in a plan view as a whole, and the two first light-emitting elements 1A and the two second light-emitting elements 1B are respectively arranged at corners of diagonals of the rectangular shape.

In the description below, a light-emitting element located at the m-th row and the n-th column of the plurality of light-emitting elements arranged in rows and columns is referred to as a light-emitting element (m, n). The light-emitting device 100 includes the first light-emitting element 1A (1, 1), the second light-emitting element 1B (1, 2), the second light-emitting element 1B (2, 1), and the first light-emitting element 1A (2, 2).

In the example shown in FIG. 1, it can also be considered that the first light-emitting element 1A, the second light-emitting element 1B, the first light-emitting element 1A, and the second light-emitting element 1B are arranged clockwise.

Alternatively, the light-emitting device may include a second light-emitting element 1B (1, 1), a first light-emitting element 1A (1, 2), a first light-emitting element 1A (2, 1), and a second light-emitting element 1B (2, 2). Also in this case, the first light-emitting element 1A and the second light-emitting element 1B are arranged adjacent to each other alternately in each row.

In the example shown in FIG. 1, in a plan view, the lens center of each of the Fresnel lenses of the compound eye lens 30 and the center of a corresponding one of the first light-emitting elements 1A or the second light-emitting elements 1B that faces the respective Fresnel lens are located offset from each other. In the example shown in FIG. 1, the centers of the first light-emitting elements 1A and the centers of the second light-emitting elements 1B are offset toward the center of the compound eye lens 30. An offset distance is preferably 100 μm or less, which allows for reducing unevenness in illuminance distribution as described below. The expression "offset distance" as herein refers to a distance at which the center of each of the light-emitting elements 1 is offset from the lens center of a corresponding one of the lens parts facing the respective light-emitting element toward the center of the compound eye lens 30, and indicates a distance D1 in a plan view between the center of each of the light-emitting elements 1 and the lens center of a corresponding one of the lens parts facing the light-emitting element.

In the example shown in FIG. 1, the distance D1 between the center of each light-emitting element 1 and the lens center of a corresponding one of the lens parts facing the light-emitting element is preferably 0 mm to 0.1 mm in a plan view. Further, a distance D2 between the center of the first light-emitting element 1A and the center of the second light-emitting element 1B is preferably in arrange of 1.2 mm to 1.3 mm.

Operation of Light-Emitting Device

When the light-emitting device 100 having a structure as described above is connected to an external power source, the light-emitting element 1 is supplied with current and emits light. The light is extracted outside from the upper surface of the light-emitting element 1 through the compound eye lens 30. The light propagating in a lateral direction of the light-emitting element 1 is reflected at the protective member 8, and is extracted outside from the upper surface of the light-emitting element 1. Further, in the light-emitting device 100, the first light-emitting elements 1A and the second light-emitting elements 1B can be individually controlled. Accordingly, when the light-emitting device 100 is used for a flash module for a camera, a desired emission color according to an object to be photographed can be obtained. For example, when only the first light-emitting elements 1A are allowed to emit light, white light is emitted, and when only the second light-emitting elements 1B are allowed to emit light, amber light is emitted. Alternate arrangement of the first light-emitting elements 1A and the second light-emitting elements 1B allows for reducing unevenness in illuminance distribution of each emission color. When the first light-emitting elements 1A and the second light-emitting elements 1B are allowed to emit light simultaneously, both the white light and the amber light are emitted and diffused by the compound eye lens 30. With the first light-emitting elements 1A and the second light-emitting elements 1B that are alternately arranged such that the center of each of the first light-emitting elements 1A and the center of each of the second light-emitting elements 1B are offset from respective lens centers of respective lens parts of the compound eye lens 30 toward the center of the compound eye lens 30 as described below, unevenness in illuminance distribution and emission unevenness in emission color can be reduced. Thus, the light-emitting device 100 can irradiate light of a uniform emission color to an irradiation region, even when irradiating light of adjusted color obtained from the first light-emitting elements 1A and the second light-emitting elements 1B.

Method of Manufacturing Light-Emitting Device

Figure 4:
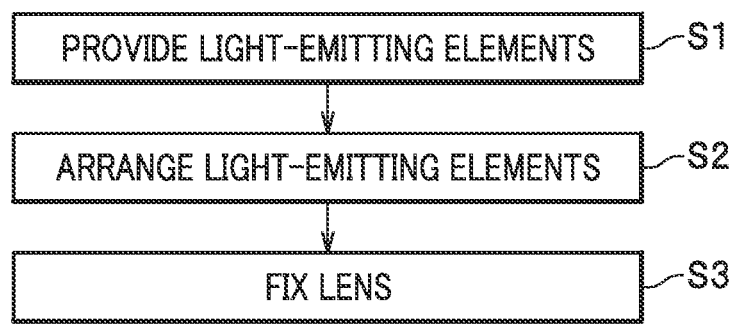
FIG. 4 is a flowchart showing a procedure of a method of manufacturing the light-emitting device according to the first embodiment.

A method of manufacturing the light-emitting device 100 shown in FIG. 1 will be described. As shown in FIG. 4, the method of manufacturing the light-emitting device 100 includes providing light-emitting elements (S1), arranging light-emitting elements (S2), and fixing a lens (S3), which are performed in this order.

In the step S1 of providing light-emitting elements, the plurality of light-emitting elements 1 are provided.

In this step, the two first light-emitting elements 1A and the two second light-emitting elements 1B are provided. Light-emitting elements that have already been manufactured may be used for the first light-emitting elements 1A and the second light-emitting elements 1B, or the first light-emitting elements 1A and the second light-emitting elements 1B may be manufactured as a part of the method. When manufacturing the first light-emitting elements 1A, for example, a sapphire substrate is used for the light transmissive substrate 21, and the semiconductor layer 22 made of nitride semiconductors containing an active region made of InGaN-based semiconductor is formed using metal organic chemical vapor deposition (MOCVD) method. Further, the positive and negative electrodes 23 made of, for example, an Au/Ti alloy are disposed on the semiconductor layer 22. Accordingly, a chip of the blue light-emitting diode 2 can be formed. Subsequently, a resin layer containing the yellow phosphor is applied on a surface of the substrate 21 of the blue light-emitting diode 2 using, for example, screen printing method, so that the first wavelength conversion member 3A is formed. Furthermore, the lateral surfaces of the first wavelength conversion member 3A are covered with the protective member 8. The upper surface of the first wavelength conversion member 3A is exposed from the protective member 8, so that the first light-emitting element 1A in which the upper surface of the first wavelength conversion member 3A serves as the main light extraction surface can be obtained. When manufacturing the second light-emitting elements 1B, the second light-emitting elements 1B can be manufactured in a manner as in manufacturing of the first light-emitting elements 1A except that a resin layer contains the red phosphor.

In the step S2 of arranging light-emitting elements, the plurality of light-emitting elements 1 are arranged in the array at the base member 5. In this step, the two provided first light-emitting elements 1A and the two provided second light-emitting elements 1B are alternately arranged at the base member 5. Each of the positive and negative electrodes 23 of each light-emitting element 1 and a corresponding one of the conductive wirings 6 on the base member 5 are connected via the bonding members 9 (for example, solder) such that each of the light-emitting elements 1 faces a corresponding one of the lens parts of the compound eye lens 30 and the center of each of the plurality of light-emitting elements 1 is located offset from the lens center of the corresponding lens part toward the center of the compound eye lens 30, and.

In the step S3 of securing a lens, the compound eye lens 30 is fixed above the base member 5 of the light source device 10. In this step, the compound eye lens 30, in which the lens parts each including the substantially circular Fresnel lens are integrated, is disposed above the light source device 10. The lens holder 31 is secured on the base member 5 so that the upper surfaces of the light source device 10 and the light incident surface of the compound eye lens 30 are spaced apart from each other. The lens holder 31 is disposed on the base member 5 via the resin material and heated, so that the base member 5 and the lens holder 31 are bonded. Through the steps described above, the light-emitting device 100 shown in FIG. 1 can be manufactured.

Alternatively, instead of the step S1 of providing light-emitting elements and the step S2 of arranging light-emitting elements, plate-shaped first wavelength conversion members 3A and plate-shaped second wavelength conversion members 3B may be alternately bonded onto the substrates 21 of respective blue light-emitting diodes 2 that have been arranged on the base member 5.

Figure 5:
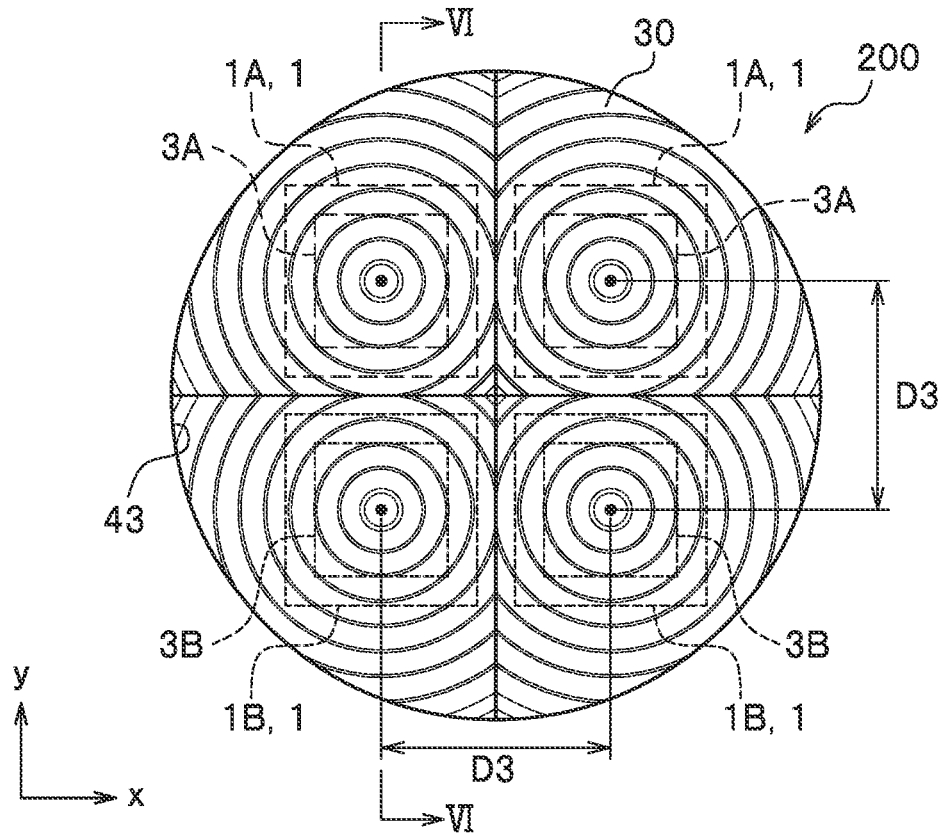
FIG. 5 is a schematic plan view showing a configuration of a light-emitting device according to a first comparative example.
Figure 6:
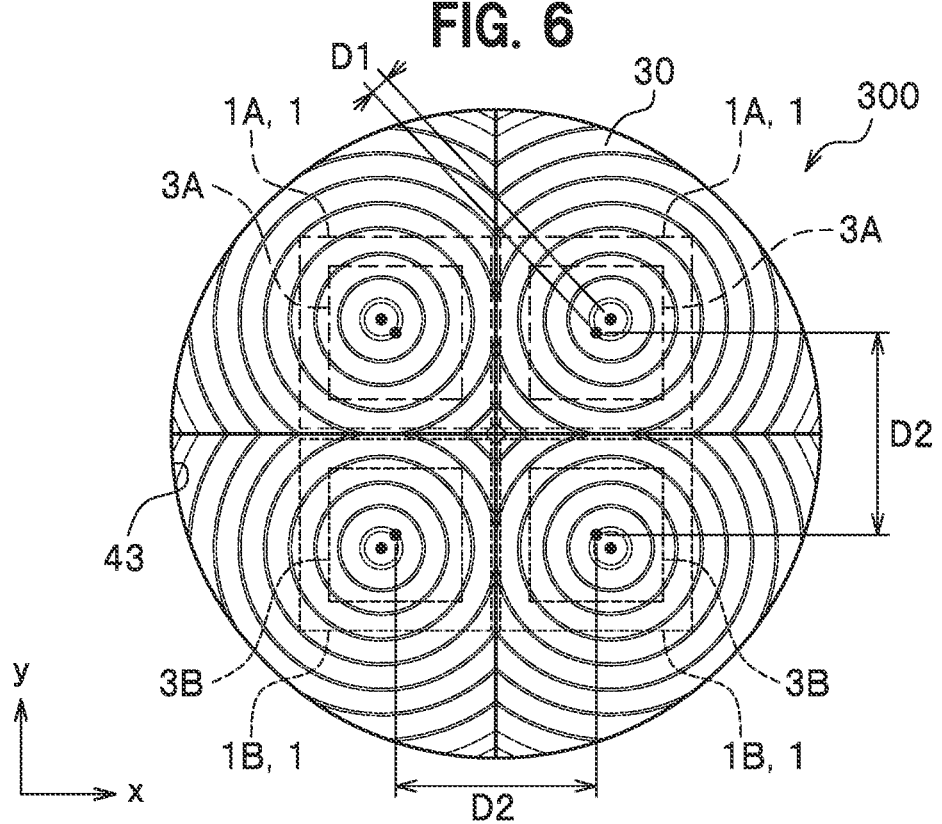
FIG. 6 is a schematic plan view showing a configuration of a light-emitting device according to a second comparative example.

Next, effects of the light-emitting device 100 will be described. Light-emitting devices according to comparative examples are shown in FIG. 5 and FIG. 6, in each of which the first light-emitting elements 1A and the second light-emitting elements 1B are not alternately arranged and the number of light-emitting elements 1 and the size of the compound eye lens 30 are the same as those in the light-emitting device 100. FIG. 5 is a plan view schematically showing a configuration of the light-emitting device according to a first comparative example. FIG. 6 is a plan view schematically showing a configuration of the light-emitting device according to a second comparative example. In each of FIG. 5 and FIG. 6, a housing 4 is not illustrated, and a portion of the light-emitting device that can be seen through a cover glass 42 attached to a through hole 43 of a main body 41 is illustrated.

As shown in FIG. 5, a light-emitting device 200 according to the first comparative example includes two first light-emitting elements 1A disposed in a first row, and two second light-emitting elements 1B disposed in a second row. When a light-emitting element 1 located in the m-th row and the n-th column is referred to as a "light-emitting element 1 (m, n)", the light-emitting device 200 includes the first light-emitting element 1A (1, 1), the first light-emitting element 1A (1, 2), the second light-emitting element 1B (2, 1), and the second light-emitting element 1B (2, 2). In the light-emitting device 200 according to the first comparative example, each of Fresnel lenses of a compound eye lens 30 faces a corresponding one of the first and second light-emitting elements 1A and 1B, and, in a plan view, a lens center of each Fresnel lens of the compound eye lens 30 and a center of the corresponding one of the first and second light-emitting elements 1A and 1B substantially correspond to each other.

On the other hand, the intervals between the light-emitting elements 1 is smaller in the light-emitting device 100 than in the light-emitting device 200. That is, the distance D2 between the centers of adjacent light-emitting elements shown in FIG. 1 is shorter than a distance D3 between the centers of adjacent light-emitting elements shown in FIG. 5. Accordingly, in the light-emitting device 100, reduction in intervals between the light-emitting elements 1 allows for obtaining an area that can be effectively used for, for example, a mounting area for a member other than the light-emitting elements such as a protection device or a sensor. Therefore, it is not necessary to add areas for mounting the members other than the light-emitting elements, so that the entire size of the light-emitting device can be reduced.

Figure 7:
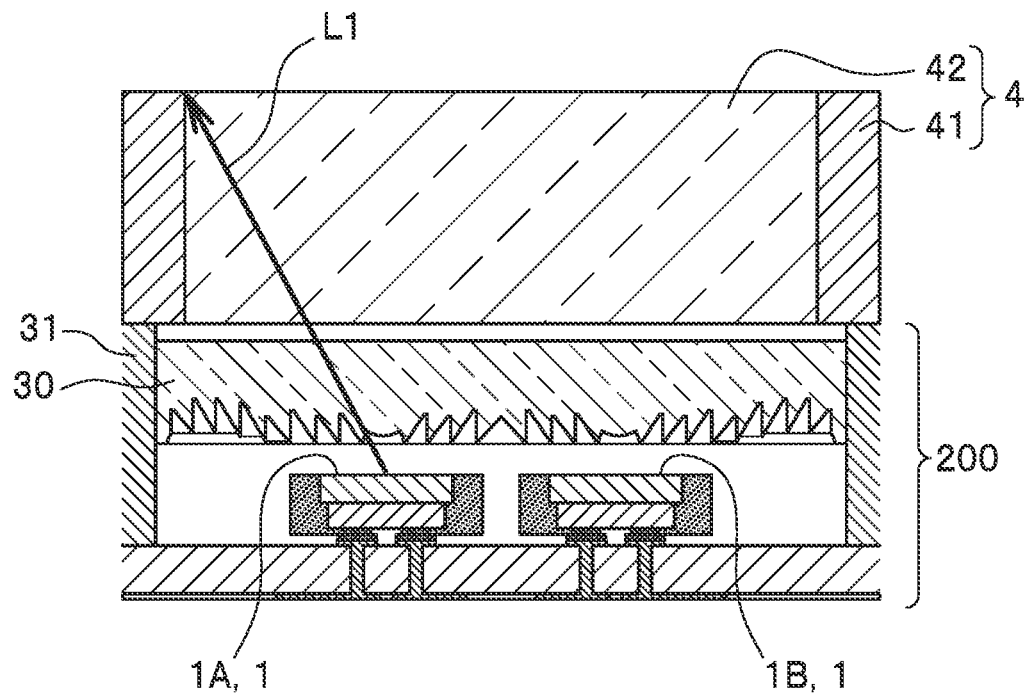
FIG. 7 is a schematic sectional view showing the configuration of the light-emitting device according to the first comparative example.

When the light-emitting device 200 according to the first comparative example is incorporated in the housing 4, as shown in FIG. 7, for example, a light beam L1, which is a portion of light emitted from the first light-emitting elements 1A, is absorbed by the main body 41 of the housing 4, and may not be extracted outside.

Figure 8:
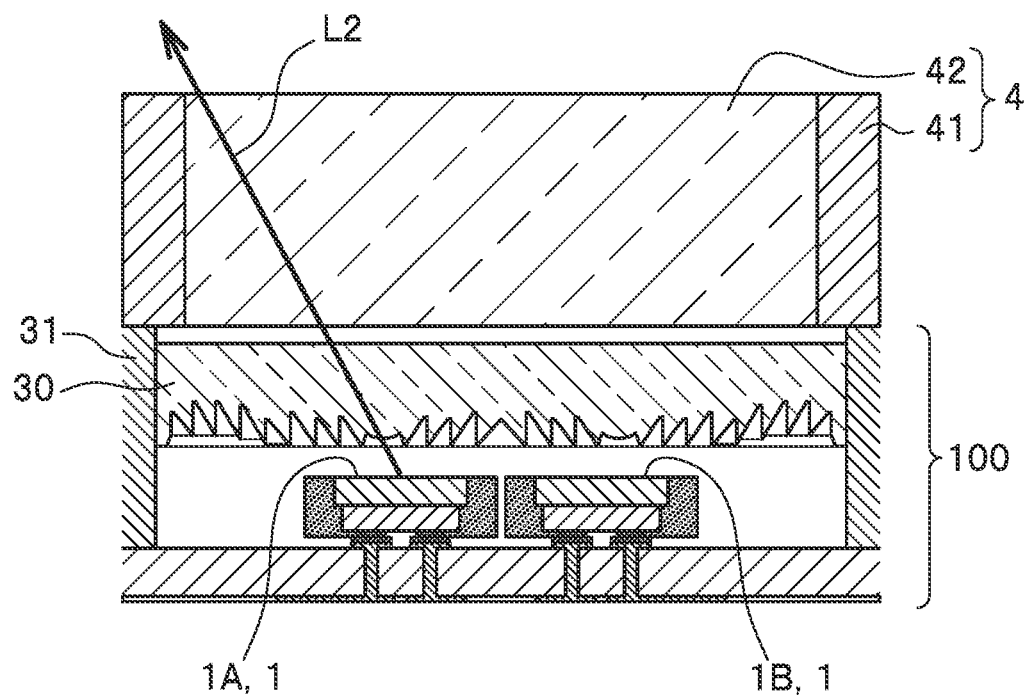
FIG. 8 is a schematic sectional view showing the configuration of the light-emitting device according to the first embodiment.

On the other hand, when the light-emitting device 100 is incorporated in the housing 4, as shown in FIG. 8, for example, a light beam L2, which is a portion of light emitted from the first light-emitting elements 1A, is not absorbed by the main body 41 of the housing 4, and can be extracted outside. Therefore, light absorbed by the main body 41 of the housing 4 can be reduced more in the light-emitting device 100 than in the light-emitting device 200. Accordingly, in the light-emitting device 100, utilization ratio of light emitted from the light-emitting elements 1 can be improved. In the description above, the light beam L2 and the light beam L1 are assumed to be emitted at a same angle from a same position on the first light-emitting elements 1A.

As shown in FIG. 6, a light-emitting device 300 according to the second comparative example includes, as in the light-emitting device 200, a first light-emitting element 1A (1, 1), a first light-emitting element 1A (1, 2), a second light-emitting element 1B (2, 1), and a second light-emitting element 1B (2, 2). In the light-emitting device 300, as in the light-emitting device 100, each of the Fresnel lenses of a compound eye lens 30 faces a corresponding one of the first light-emitting elements 1A or a corresponding one of the second light-emitting elements 1B, and in a plan view, a lens center of each Fresnel lens of a compound eye lens 30 is offset from a center of the corresponding one of the first light-emitting elements 1A or a center of the corresponding one of the second light-emitting elements 1B. Therefore, light absorbed by the main body 41 of the housing 4 can be reduced more in the light-emitting device 300 than in the light-emitting device 200.

Figure 9:
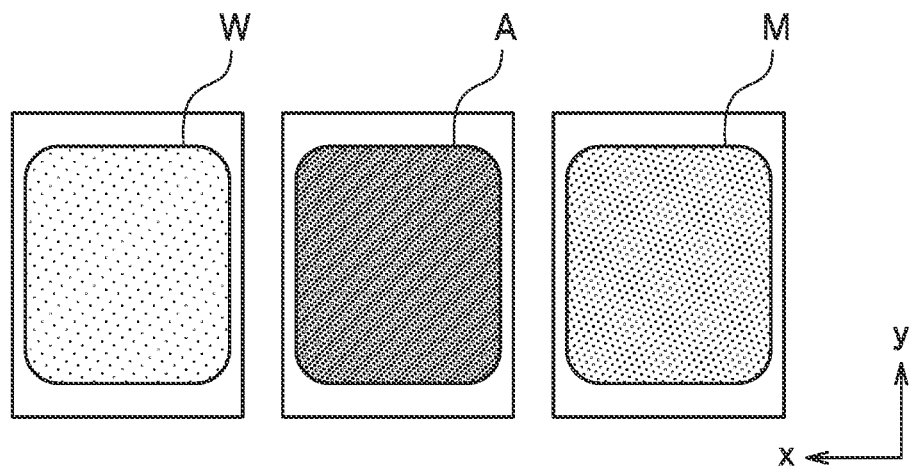
FIG. 9 schematically shows luminance distributions obtained by the light-emitting device according to the first comparative example.
Figure 10:
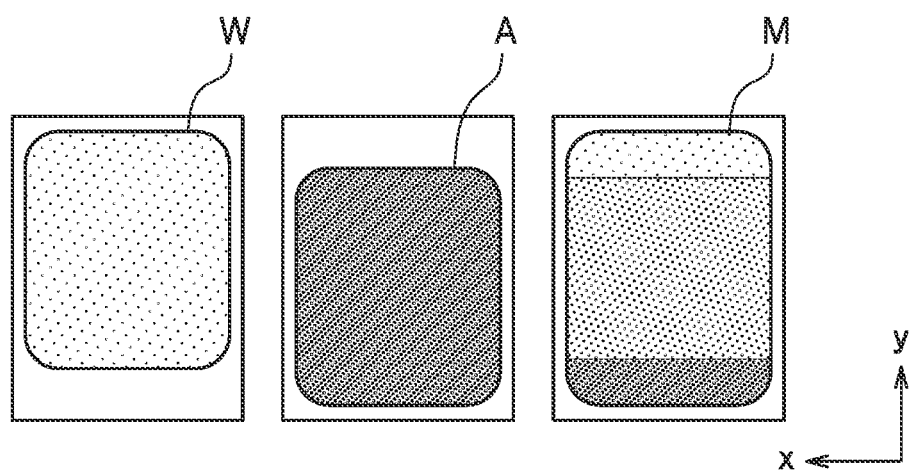
FIG. 10 shows schematic luminance distributions irradiated by the light-emitting device according to the second comparative example.
Figure 11:
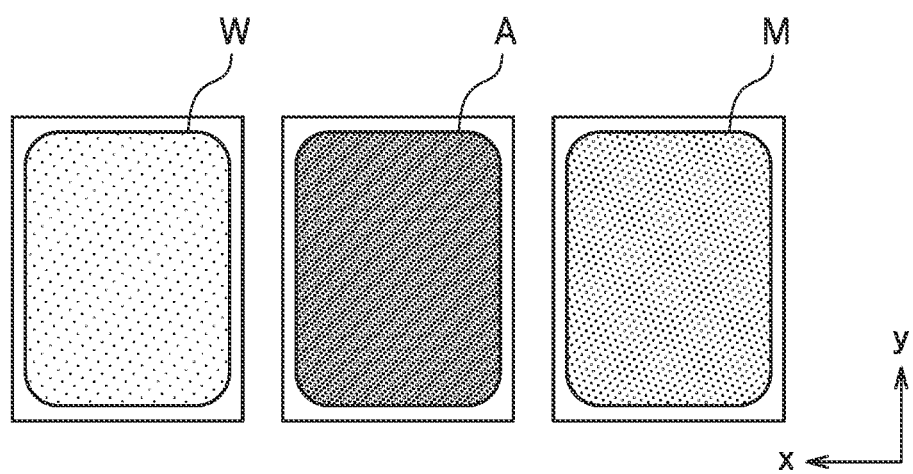
FIG. 11 shows schematic irradiation distributions irradiated by the light-emitting device according to the first embodiment.

FIGS. 9 to 11 respectively show schematic irradiation distributions irradiated by the light-emitting devices 200, 300, and 100. FIG. 9 shows schematic irradiation distributions irradiated by the light-emitting device according to the first comparative example. FIG. 10 shows schematic irradiation distributions irradiated by the light-emitting device according to the second comparative example. FIG. 11 shows schematic irradiation distributions irradiated by the light-emitting device according to the first embodiment. Note that rectangular frames in FIGS. 9 to 11 indicate an angle of view of a camera (i.e., regions captured by a camera), in which a positive direction of x-axis is opposite to those in FIGS. 1, 5 and 6. Each of FIGS. 9 to 11 shows, in order from left to right, illuminance distribution when only the first light-emitting elements 1A emit light, illuminance distribution when only the second light-emitting elements 1B emit light, and illuminance distribution when the first light-emitting elements 1A and the second light-emitting elements 1B collectively emit light. Symbols "W" "A" and "M" respectively denote the illuminance distributions of white light, amber light, and mixed-color light in which white light and amber light are mixed.

As shown in FIG. 9, in the light-emitting device 200 according to the first comparative example, the illuminance distributions W, A, and M are uniform.

However, when the light-emitting device 200 according to the first comparative example is incorporated in the housing 4, light absorbed by the main body 41 of the housing 4 may not be extracted outside as described above, so that a narrower region in the angle of view of the camera can be irradiated as compared to the light-emitting device according to the first embodiment.

In the light-emitting device 300 according to the second comparative example, center of each of the light-emitting elements is offset from the lens center of a corresponding lens part.

With this arrangement, light emitted from the first light-emitting element 1A (1, 1) and passing through a corresponding lens part of the compound eye lens 30 shifts in a positive y-axis direction, light emitted from the first light-emitting element 1A (1, 2) and passing through a corresponding lens part of the compound eye lens 30 shifts in a positive y-axis direction, light emitted from the second light-emitting element 1B (2, 1) and passing through a corresponding lens part of the compound eye lens 30 shifts in a negative y-axis direction, and light emitted from the second light-emitting element 1B (2, 2) and passing through the compound eye lens 30 shifts in a negative y-axis direction.

That is, light emitted from the first light-emitting elements 1A (1, 1) and 1A (1, 2) and passing through respective corresponding lens parts of the compound eye lens 30 shift in the same direction, which may likely result in uneven distribution of illuminance.

Also, light emitted from the second light-emitting elements 1B (2, 1) and 1B (2, 2) and passing through respective corresponding lens parts of the compound eye lens 30 shift in the same direction, which may likely result in uneven distribution of illuminance.

Accordingly, in the light-emitting device 300, when light is emitted from only the first light-emitting elements 1A, as shown in the left of FIG. 10, the illuminance distribution W is uneven in the positive y-axis direction in the angle of view of the camera. When light is emitted from only the second light-emitting elements 1B, as shown in the middle of FIG. 10, the illuminance distribution A is uneven in the negative y-axis direction in the angle of view of the camera. When light is emitted collectively from the first light-emitting elements 1A and the second light-emitting elements 1B, as shown in the right of FIG. 10, the illuminance distribution M is not uneven in the angle of view of the camera, and is distributed such that a shift in a positive y-axis direction and a shift in a negative y-axis direction are integrated. Meanwhile, a white area and an amber area are generated near outer periphery of the mixed-color area in the positive y-axis direction and outer periphery of the mixed-color area the negative y-axis direction, respectively, so that unevenness in emission color occurs.

On the other hand, also in the light-emitting device 100, the center of each of the light-emitting elements is offset from the lens center of a corresponding lens part.

With this arrangement, light emitted from the first light-emitting element 1A (1, 1) and passing through a corresponding lens part of the compound eye lens 30 shifts in a positive y-axis direction, light emitted from the first light-emitting element 1B (1, 2) and passing through a corresponding lens part of the compound eye lens 30 shifts in a positive y-axis direction, light emitted from the second light-emitting element 1B (2, 1) and passing through a corresponding lens part of the compound eye lens 30 shifts in a y-axis negative direction, and light emitted from the first light-emitting element 1A (2, 2) and passing through a corresponding lens part of the compound eye lens 30 shifts in a y-axis negative direction.

That is, light emitted from the first light-emitting elements 1A (1, 1) and 1A (2, 2) and passing through respective corresponding lens parts of the compound eye lens 30 shift in opposite directions, which allows for reducing unevenness in distribution of illuminance.

Also, light emitted from the second light-emitting elements 1B (1, 2) and 1B (2, 1) and passing through respective corresponding lens parts of the compound eye lens 30 shift in opposite directions, which allows for reducing unevenness in distribution of illuminance.

Accordingly, in the light-emitting device 100, as shown in FIG. 11, each of illuminance distributions W, A, and M is not uneven, and is distributed such that a shift in a positive y-axis direction and a shift in a negative y-axis direction are integrated. Further, emission color of the illuminance distribution M can be uniform.

Second Embodiment

Figure 12:
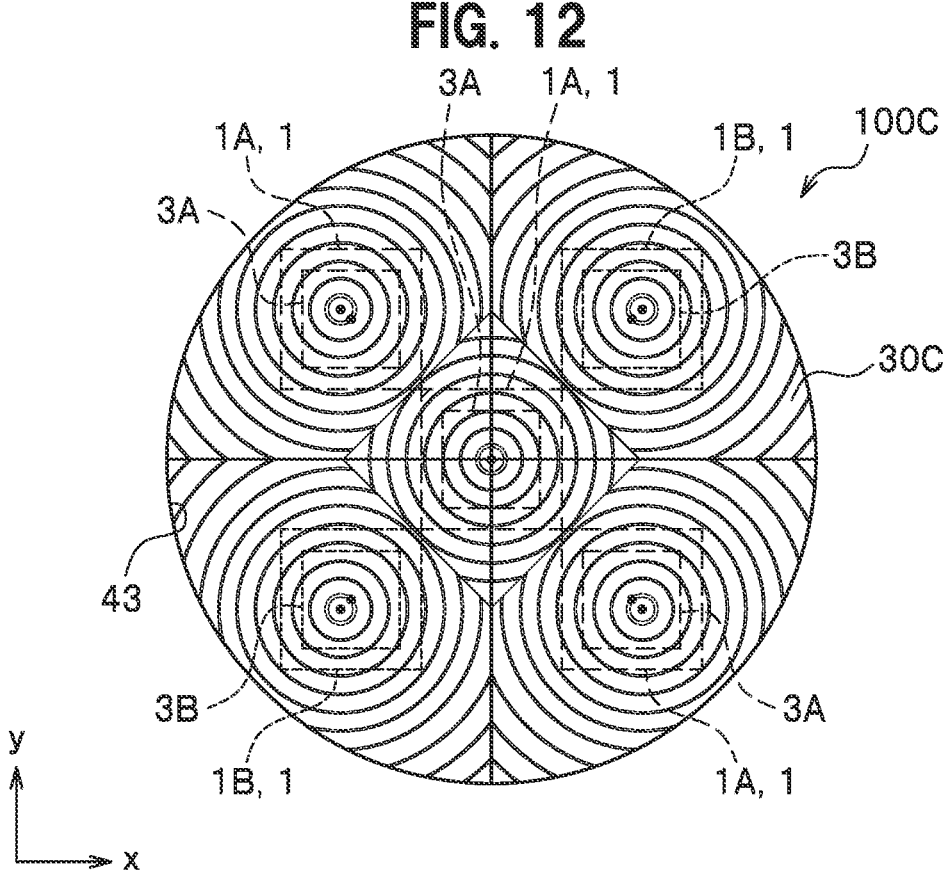
FIG. 12 is a schematic plan view showing a configuration of a light-emitting device according to a second embodiment.

FIG. 12 is a plan view schematically showing a configuration of a light-emitting device according to a second embodiment. As shown in FIG. 12, a light-emitting device 100C according to the second embodiment includes a different number of light-emitting elements and a different shape of compound eye lens from those of the light-emitting device 100 according to the first embodiment. Hereinafter, the same reference numerals indicate the same or similar components as those of the light-emitting device 100 shown in FIG. 1, and duplicative description thereof will be omitted. In FIG. 12, illustration of a housing 4 is omitted, and a portion of the light-emitting device that can be seen through a cover glass 42 attached to a through hole 43 of a main body 41 is shown.

The light-emitting device 100C includes a light source device 10 including a plurality of light-emitting elements 1 arranged in an array on a base member 5 (see FIG. 2), and a compound eye lens 30C. The compound eye lens 30C is disposed above the base member 5 such that a lens holder 31 disposed between the compound eye lens 30C and the base member 5 (see FIG. 2), and includes a plurality of lens parts each facing a corresponding one of the light-emitting elements 1. As shown in FIG. 12, in a plan view, one of the plurality of light-emitting elements 1 is disposed such that the center of the one light-emitting element faces a lens center of the lens part disposed at a center of the compound eye lens 30C. Also, the other light-emitting elements of the plurality of light-emitting elements 1 are disposed such that, in a plan view, the center of each of the other light-emitting elements is offset from a lens center of a corresponding lens part of the compound eye lens 30C in a direction toward the center of the compound eye lens 30C. Further, the other light-emitting elements of the plurality of light-emitting elements 1 include first light-emitting elements 1A and second light-emitting elements 1B having different emission colors and alternately arranged adjacent to each other.

The light-emitting device 100C includes the plurality of light-emitting elements 1. Of the plurality of light-emitting elements 1, first light-emitting elements 1A emit white light, and second light-emitting elements 1B emit amber light, which has a more red component than that of light emitted from the first light-emitting elements 1A. The light-emitting element 1 that faces the lens part disposed at the center of the compound eye lens 30C in a plan view is the first light-emitting element 1A.

The light-emitting device 100C according to the present embodiment includes the first light-emitting element 1A (1, 1), the second light-emitting element 1B (1, 2), the second light-emitting element 1B (2, 1), the first light-emitting element 1A (2, 2), and the first light-emitting element 1A at the center of the plurality of light-emitting elements 1. With this arrangement, as in the light-emitting device 100, the light-emitting device 100C can have a small size, and unevenness in emission color of the light-emitting device 100C can be reduced. Also, with the first light-emitting element 1A disposed at the center and emitting white light, output of the light-emitting device 100C can be effectively increased. A method of manufacturing the light-emitting device 100C is the same as the method described above, and will not be described in detail.

While the light-emitting devices according to certain embodiments of the present invention has been described above, the scope of the present invention is not limited to the descriptions above and should be broadly understood on the basis of the claims. The scope of the present invention also includes various modifications based on these descriptions.

What is claimed is:

1. A light-emitting device comprising:
   a plurality of light-emitting elements arranged in an array on a base member; and
   a lens that comprises at least one lens part disposed above the base member and comprising a first surface that faces the plurality of light-emitting elements, the first surface comprising a plurality of protrusions; wherein:
   the plurality of light-emitting elements include:
   a first light-emitting element having a center that faces a lens center of the lens in a top view, the first light-emitting element comprising:
      a first light-emitting diode,
      a first wavelength conversion member having an upper surface, a lower surface, and lateral surfaces that extend between the upper surface and the lower surface, wherein the lower surface of the first wavelength conversion member is bonded to an upper surface of the first light-emitting diode, and
      a first protective member having inner surfaces that cover outer lateral surfaces of the first light-emitting diode, and
   a second light-emitting element having a center offset from the lens center of the lens in the top view, the second light-emitting element comprising:
      a second light-emitting diode,
      a second wavelength conversion member having an upper surface, a lower surface, and lateral surfaces that extend between the upper surface and the lower surface, wherein the lower surface of the second wavelength conversion member is bonded to an upper surface of the second light-emitting diode, and
      a second protective member having inner surfaces that cover outer lateral surfaces of the second light-emitting diode, wherein:
   the second protective member is separated from the first protective member, and
   a red component of light emitted from the second light-emitting element is greater than a red component of light emitted from the first light-emitting element.

2. The light-emitting device according to claim 1, wherein:
   the inner surfaces of the first protective member cover outer lateral surfaces of the first wavelength conversion member, and
   the inner surfaces of the second protective member cover outer lateral surfaces of the second wavelength conversion member.

3. The light-emitting device according to claim 1, wherein:
   the first light-emitting diode is a first blue light-emitting diode;
   the first wavelength conversion member includes a yellow phosphor;
   the second light-emitting diode is a second blue light-emitting diode; and
   the second wavelength conversion member includes a red phosphor.

4. The light-emitting device according to claim 1, wherein:
   the first wavelength conversion member contains an yttrium aluminum oxide phosphor (YAG phosphor).

5. The light-emitting device according to claim 1, wherein:
   the first wavelength conversion member contains at least one phosphor selected from $Tb_{2.95}Ce_{0.05}Al_5O_{12}$, $Y_{2.90}Ce_{0.05}Tb_{0.05}Al_5O_{12}$, $Y_{2.94}Ce_{0.05}Pr_{0.01}Al_5O_{12}$, or $Y_{2.90}Ce_{0.05}Pr_{0.05}Al_5O_{12}$.

6. The light-emitting device according to claim 1, wherein:
the second wavelength conversion member contains at least one a nitride-based phosphor selected from the group consisting of $(Sr_{0.97}Eu_{0.03})_2Si_5N_8$, $(Ca_{0.985}Eu_{0.015})_2Si_5N_8$, $(Sr_{0.679}Ca_{0.291}Eu_{0.03})_2Si_5N_8$, and sialon phosphor (SiAlON phosphor).

7. The light-emitting device according to claim 1, wherein:
the plurality of light-emitting elements further include two third light-emitting elements, wherein
the first light-emitting element is positioned between the two third light-emitting elements,
an emission color of the first light-emitting element is the same as an emission color of the third light-emitting elements, and
wherein the first light-emitting element and the two third light-emitting elements are arranged in a first direction and
the first light-emitting element and the second light-emitting element are arranged in a second direction orthogonal to the first direction.

8. The light-emitting device according to claim 7, wherein the first light-emitting element and the third light-emitting elements are individually controllable.

9. The light-emitting device according to claim 1, wherein the first light-emitting elements and the second light-emitting elements are individually controllable.

10. The light-emitting device according to claim 1, wherein:
at least one of a protective element or a sensor is disposed in an area other than a mounting area in which the plurality of light-emitting elements are mounted.

11. The light-emitting device according to claim 1, wherein:
the upper surface of the first wavelength conversion member is exposed from the first protective member, and
the upper surface of the second wavelength conversion member is exposed from the second protective member.

12. The light-emitting device according to claim 1, wherein:
each lens part comprises a flat second surface, such that a light beam emitted from the plurality of light-emitting elements is incident on the first surface and is emitted from the flat second surface.

13. The light-emitting device according to claim 1, wherein:
the first wavelength conversion member has a plate shape, and
the second wavelength conversion member has a plate shape.

14. The light-emitting device according to claim 1, wherein:
the first wavelength conversion member is rectangular in a top view, and
the second wavelength conversion member is rectangular in a top view.

15. The light-emitting device according to claim 1, wherein:
the lower surface of the first wavelength conversion member is bonded to an entirety of the upper surface of the first light-emitting diode, and
the lower surface of the second wavelength conversion member is bonded to an entirety of the upper surface of the second light-emitting diode.

16. The light-emitting device according to claim 1, wherein:
an area of the lower surface of the first wavelength conversion member is greater than an area of the upper surface of the first light-emitting diode, and
an area of the lower surface of the second wavelength conversion member is greater than an area of the upper surface of the second light-emitting diode.

17. The light-emitting device according to claim 1, wherein a distance between the center of the first light-emitting element and the center of the second light-emitting element in a top view is in a range of 1.2 mm to 1.3 mm.

18. The light-emitting device according to claim 1, wherein the at least one lens part comprises at least one Fresnel lens.

* * * * *